United States Patent
Wheeler et al.

(10) Patent No.: US 7,799,840 B2
(45) Date of Patent: Sep. 21, 2010

(54) THERMOPLASTIC VIBRATIONAL DAMPER WITH CONSTRAINING LAYER

(75) Inventors: Maurice E. Wheeler, Mentor, OH (US); Bradley D. McDonel, Fort Gratiot, OH (US)

(73) Assignee: Intellectual Property Holdings, LLC, Cleveland, OH (US)

( * ) Notice: Subject to any disclaimer, the term of this patent is extended or adjusted under 35 U.S.C. 154(b) by 462 days.

(21) Appl. No.: 11/849,395

(22) Filed: Sep. 4, 2007

(65) Prior Publication Data

US 2008/0064775 A1  Mar. 13, 2008

Related U.S. Application Data

(60) Provisional application No. 60/843,944, filed on Sep. 12, 2006.

(51) Int. Cl.
  *C08J 9/00* (2006.01)
  *C08F 36/00* (2006.01)

(52) U.S. Cl. .................. 521/83; 521/142; 521/149; 521/97; 521/92

(58) Field of Classification Search .............. 521/149, 521/83, 142, 97, 92
See application file for complete search history.

(56) References Cited

U.S. PATENT DOCUMENTS

| | | | |
|---|---|---|---|
| 2,871,218 A | 1/1959 | Schollenberger |
| 3,133,612 A | 5/1964 | Sailler |
| 3,237,716 A | 3/1966 | Parsons |
| 3,413,803 A | 12/1968 | Rosenlund et al. |
| 3,489,242 A | 1/1970 | Gladding et al. |
| 3,505,028 A | 4/1970 | Douthit |
| 3,558,538 A | 1/1971 | Wellrab et al. |
| 3,740,353 A | 6/1973 | Patrick et al. |
| 3,770,560 A | 11/1973 | Elder et al. |
| 3,863,445 A | 2/1975 | Heath |
| 3,894,169 A | 7/1975 | Miller |
| 3,908,372 A | 9/1975 | Fowler et al. |
| 3,963,087 A | 6/1976 | Grosseau |
| 4,022,019 A | 5/1977 | Garcea |
| 4,085,816 A | 4/1978 | Amagai et al. |
| 4,118,258 A | 10/1978 | Graveron et al. |
| 4,118,543 A | 10/1978 | Donohue |

(Continued)

OTHER PUBLICATIONS

International Search Report and the Written Opinion of the International Searching Authority for related application PCT/US07/77874 (10 pages).

(Continued)

*Primary Examiner*—Randy Gulakowski
*Assistant Examiner*—Kara Negrelli
(74) *Attorney, Agent, or Firm*—Pearne & Gordon LLP

(57) ABSTRACT

A constrained layer damping structure is provided, including a panel to be damped, a constraining layer and a layer of foam vibration damping material sandwiched therebetween. In one embodiment, the foam vibration damping material is provided from a composition including 5-50 weight percent polyvinyl butyral, 2-20 weight percent plasticizer, 25-65 weight percent filler, 1-15 weight percent tackifier, and 0.1-8 weight percent blowing agent, wherein the composition includes 15-65 weight percent total thermoplastic inclusive of polyvinyl butyral. In a further embodiment, the polyvinyl butyral is provided as recycled material from recycled auto glass, and includes a small quantity of plasticizer, typically but not necessarily of the phthalate-type or hexanoate-type.

30 Claims, 1 Drawing Sheet

U.S. PATENT DOCUMENTS

| | | |
|---|---|---|
| 4,133,932 A | 1/1979 | Peck |
| 4,142,605 A | 3/1979 | Bosch |
| 4,191,798 A | 3/1980 | Schumacher et al. |
| 4,194,484 A | 3/1980 | Kirchweger et al. |
| 4,308,093 A | 12/1981 | Bogendorf et al. |
| 4,311,751 A | 1/1982 | Brueggemann et al. |
| 4,315,971 A | 2/1982 | Taylor |
| 4,367,259 A | 1/1983 | Fulmer et al. |
| 4,390,594 A | 6/1983 | Dages |
| 4,432,433 A | 2/1984 | Ogawa |
| 4,433,542 A | 2/1984 | Shimura |
| 4,438,228 A | 3/1984 | Schenk |
| 4,456,705 A | 6/1984 | McCarthy |
| 4,468,499 A | 8/1984 | Siegfried et al. |
| 4,487,289 A | 12/1984 | Kicinski |
| 4,495,240 A | 1/1985 | McCarthy |
| 4,511,679 A | 4/1985 | Ariyoshi et al. |
| 4,612,767 A | 9/1986 | Engquist et al. |
| 4,678,707 A * | 7/1987 | Shinozaki et al. ............ 428/323 |
| 4,709,781 A | 12/1987 | Scherzer |
| 4,719,247 A | 1/1988 | Lin et al. |
| 4,734,323 A | 3/1988 | Sato et al. |
| 4,740,427 A | 4/1988 | Ochiumi et al. |
| 4,766,028 A | 8/1988 | Rich |
| 4,792,574 A | 12/1988 | Berkowitz |
| 4,803,105 A | 2/1989 | Kretow et al. |
| 4,803,112 A | 2/1989 | Kakimoto |
| 4,842,938 A | 6/1989 | Rizk et al. |
| 4,851,271 A | 7/1989 | Moore et al. |
| 4,860,851 A | 8/1989 | Krevor et al. |
| 4,883,717 A | 11/1989 | Kitamura et al. |
| 4,887,788 A | 12/1989 | Fischer et al. |
| 4,899,323 A | 2/1990 | Fukahori |
| 4,914,912 A | 4/1990 | Akatsuka |
| 4,930,678 A | 6/1990 | Cyb |
| 4,952,610 A | 8/1990 | Morre et al. |
| 4,972,674 A | 11/1990 | Yamada et al. |
| 4,987,194 A | 1/1991 | Maeda et al. |
| 5,008,324 A | 4/1991 | Killgoar, Jr. et al. |
| 5,066,708 A | 11/1991 | Koller, Sr. et al. |
| 5,143,755 A | 9/1992 | Moore et al. |
| 5,160,783 A | 11/1992 | Nemoto et al. |
| 5,162,156 A | 11/1992 | Troughton, Jr. et al. |
| 5,167,060 A | 12/1992 | Nawrocki et al. |
| 5,190,986 A | 3/1993 | Allen et al. |
| 5,213,879 A | 5/1993 | Niwa et al. |
| 5,233,832 A | 8/1993 | Moore |
| 5,271,612 A * | 12/1993 | Yada et al. ................... 267/158 |
| 5,300,355 A | 4/1994 | Mifune et al. |
| 5,318,837 A | 6/1994 | Yoshinaka et al. |
| 5,350,610 A | 9/1994 | Mashita et al. |
| 5,487,928 A | 1/1996 | Fujimoto |
| 5,578,800 A | 11/1996 | Kijima |
| 5,590,524 A | 1/1997 | Moore et al. |
| 5,635,562 A * | 6/1997 | Malcolm .................... 525/108 |
| 5,858,521 A * | 1/1999 | Okuda et al. ................ 428/219 |
| 6,110,985 A * | 8/2000 | Wheeler ....................... 521/83 |
| 6,130,284 A * | 10/2000 | Singh .......................... 524/495 |
| 6,309,985 B1 | 10/2001 | Vimelson et al. |
| 7,524,910 B2 * | 4/2009 | Jiang et al. .................. 526/348 |
| 2004/0175535 A1 * | 9/2004 | Bell ............................. 428/95 |

OTHER PUBLICATIONS

Kuraray Co. Ltd., "Anti-damping and thermoplastic elastmer VS-POLYMER", Kuraray Co. Ltd., Aug. 1993, 15 pgs.

Kuraray Co. Ltd., "Damping and thermoplastic rubber VS-POLYMER", Kuraray Co. Ltd., Aug. 1995, 15 pgs.

Kuraray Co. Ltd., "HYBRAR—New TPE with Vibration Damping Effect", Kuraray Co. Ltd., Mar. 1993, 14 pgs.

Wiley & Sons, Inc., "Kirk-Othmer Concise Encyclopedia of Chemical Technology", John Wiley & Sons, Inc., 1985, pp. 518-521.

Thiokol Propulsion, TCR, (Composite Resin System), Thiokol Propulsion, TCR, 1998, 7 pgs.

Carborundum Company, "Fiberfrax Ceramic Fiber Paper" brochure, 1990, 3 pgs.

* cited by examiner

THERMOPLASTIC VIBRATIONAL DAMPER WITH CONSTRAINING LAYER

This application claims the benefit of U.S. provisional application Ser. No. 60/843,944 filed Sep. 12, 2006, the contents of which are incorporated herein by reference.

FIELD OF THE INVENTION

The invention relates to constrained layer damping compositions and more particularly to expandable constrained layer vibration damping compositions and structures using said compositions.

DESCRIPTION OF RELATED ART

It is a goal in the automotive industry to reduce and minimize the amount of noise produced by the automobile, particularly noise inside the passenger compartment. It is known to use constrained layer damping structures and materials to reduce the vibration of the automobile body panels and thereby reduce the noise produced by the automobile. See U.S. Pat. Nos. 5,635,562; 4,987,194; and 5,143,755, the contents of which are hereby incorporated by reference. However, there is a need for more effective constrained layer structures having improved or more effective vibration damping materials which provide increased stiffness and reduced sound transmission. For a given mass, increased stiffness shifts the natural vibrational frequency of a panel to a higher frequency which is more easily damped by a constrained layer structure.

SUMMARY OF THE INVENTION

A vibration damping composition is provided, and includes 5-50 weight percent polyvinyl butyral, 2-20 weight percent plasticizer, 25-65 weight percent filler, 1-15 weight percent tackifier, and 0.1-8 weight percent blowing agent. The composition has 15-65 weight percent total thermoplastic inclusive of polyvinyl butyral.

In another embodiment, the composition includes 6-8 weight percent plasticizer, 39-50 weight percent recycled polyvinyl butyral that includes additional plasticizer therein, 10-12 weight percent total ethylene vinyl acetate, 30-40 weight percent filler, 2.5-2.8 weight percent tackifier, 0.5-1 weight percent surfactant, 0.3-1 weight percent activator, 0.3-1 weight percent colorant, and 3-4 parts by weight per hundred rubber of a blowing agent, wherein 'rubber' refers to all of the remaining components in the composition taken together.

A constrained layer damping structure is also provided, including a panel to be damped, a constraining layer and a layer of foam vibration damping material sandwiched between the panel and the constraining layer. The layer of foam vibration damping material is made from one of the compositions described above that has been expanded to a foamed state.

A further vibration damping composition is provided, which includes 15-65 weight percent total thermoplastic, 2-15 weight percent plasticizer, 25-65 weight percent filler, 1-15 weight percent tackifier, and 0.1-8 weight percent blowing agent The thermoplastic component comprises one or more materials selected from among the following:

0-40 weight percent polyvinyl butyral, 0-10 weight percent of one or more of the following materials: polyvinyl acetate and vinyl acetate/vinyl versatate copolymer, and 0-60 weight percent other thermoplastics.

At least one of polyvinyl butyral, polyvinyl acetate and vinyl acetate/vinyl versatate copolymer must be present in the composition.

DETAILED DESCRIPTION OF PREFERRED EMBODIMENTS OF THE INVENTION

Figure 1:
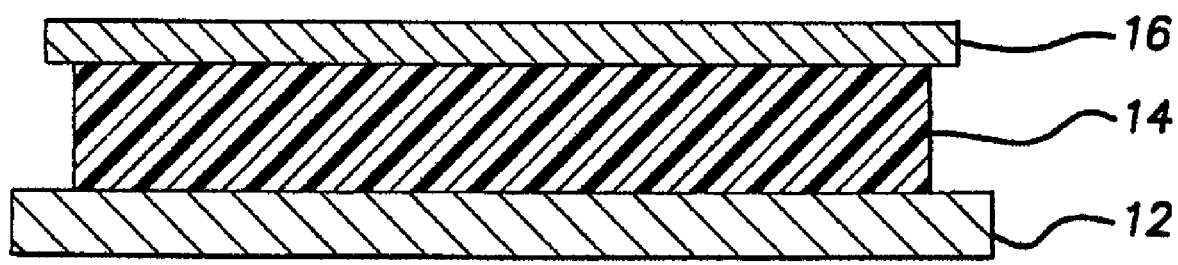
FIG. 1 is a schematic, cross-sectional view of a constrained layer damping structure.

As used herein, parts are parts by weight and percentages are weight percents unless otherwise indicated or apparent. When a preferred range such as 5-25 is given, this means preferably at least 5 and, separately and independently preferably not more than 25.

With reference to FIG. 1 there is shown schematically a constrained layer damping structure having a panel 12 to be damped, such as a metal automobile body panel, a layer 14 of vibration damping material according to the compositions presently disclosed, and a constraining layer 16. The panel 12 to be damped is or can be an automobile body panel (or any other panel) that otherwise suffers from or experiences vibration. Damping layer 14 is a polymeric damping layer adhered or disposed between between the panel 12 that is to be damped, such as an automobile body panel, and the rigid constraining panel 16. The panel 12 being damped is preferably a steel sheet (preferably cold rolled steel) about 0.66 mm to 0.76 mm thick, less preferably thinner or thicker, less preferably other ferrous materials such as stainless steel or tin-free steel, less preferably other metallic non-ferrous materials such as aluminum, less preferably other rigid, non-metallic materials such as polyethylene, polypropylene, cardboard, wood, or any other rigid material. In one preferred embodiment, the panel 12 to be damped is a body panel of an automobile.

The constraining layer 16 is preferably the same thickness as or thinner than the panel 12 to be damped, preferably cold rolled steel 0.50 mm thick, less preferably 0.30 mm to 0.76 mm thick, less preferably 0.15 mm to 0.76 mm thick, less preferably other ferrous materials such as stainless steel or tin-free steel, less preferably other metallic non-ferrous materials such as aluminum, less preferably other rigid, non-metallic materials such as polyethylene, polypropylene, cardboard, wood, or any other rigid material. The polymeric damping material for the damping layer 14, prior to expansion (i.e. through foaming), is preferably 1 mm thick, less preferably 0.7 mm to 1.2 mm thick, less preferably 0.5 mm to 1.5 mm thick, less preferably 0.5 mm to 2 mm thick, less preferably 0.5 mm to 2.5 mm thick. The damping layer 14 after expansion (i.e. through foaming) is preferably 1.5 mm thick, less preferably 1.2 mm to 2.5 mm thick, less preferably 1 mm to 3 mm thick, less preferably 1 mm to 4 mm thick. The expanded thickness of the damping layer is equal to the standoff distance or separation thickness or gap between the panel 12 to be damped and the constraining panel 16. The expansion of the damping material during foaming is sufficient to produce a damping layer 14 whose thickness corresponds to and fills this gap, preferably between 50% to 300%.

The polymeric damping material for damping layer 14 includes a combination of one or more of thermoplastic resin, plasticizer, inorganic filler, tackifier, process aid, blowing agent, and optionally one or more activator and/or colorant. The vibration damping composition used for layer 14 has the following preferred formulation as shown in table 1. In table 1, all values are weight percents. It is to be further understood that a damping composition according to the present invention need not necessarily draw its entire composition from a single column in table 1; such a composition may, for example, include one or some components from the "preferred" column below, other component(s) from the "less preferred" column, and still other component(s) from the "still less preferred" column.

TABLE 1

| Ingredient | Preferred Weight Percent | Less Preferred Weight Percent | Still Less Preferred Weight Percent |
|---|---|---|---|
| Total Thermoplastic | | | |
| Resin | 25-42 | 20-50 | 15-65 |
| PVB | 10-20 | 5-35 | 0-50 |
| and/or PVAc/PAV | 5-8, or 5-10 | 3-15 | 0-20 |
| and | 5-37 | 3-42 | 0-60 |
| Other Thermoplastics | | | |
| Plasticizer | 3.7-4.5 | 3-8.5 | 2-15, or 2-20 |
| Filler | 40-57 | 35-60 | 25-65 |
| Tackifier | 3.6-10 | 2-12 | 1-15 |
| Process Aid | 4-9 | 2-15 | 0.1-20 |
| Blowing Agent | 1.5-2.0 | 1-5 | 0.1-8 |
| Activator | 0.4 | 0.1-1.5 | 0-5 |
| Colorant | 0.2 | 0.1-2 | 0-10 |

The thermoplastic resin provides damping characteristics and is preferably based on synthetic materials. From table 1, it can be seen that the thermoplastic resin includes or may include mixtures of polyvinyl butyral (PVB), polyvinyl acetate (PVAc), vinyl acetate/vinyl versatate copolymer (PAV) as well as other thermoplastics. While each of these categories of thermoplastic resins is said in table 1 to have a minimum concentration of "0" in the complete formulation (see "still less preferred" column in table 1), it should be understood that these cannot all be zero. This should be apparent from the fact that the composition of table 1 includes at least 15 weight percent total thermoplastic. Furthermore, the values for PVAc/PAV in table 1 represent the total amount of both components (PVAc and PAV copolymer) that are present in the composition, which may include only PVAc, only PAV copolymer or a mixture of the two.

PVB is a preferred component of the total thermoplastics in the composition. Preferred forms of PVB are products known as B-79 and B-98 available from Solutia. Product B-79 is a polyvinyl butyral product having a molecular weight of 50-80 g/mol, a hydroxyl number of 10.5-13 and a polyvinyl acetate content of 0-1.5%. Product B-98 is a polyvinyl butyral product having a molecular weight of 40-70 g/mol, a hydroxyl number of 18-20 and a polyvinyl acetate content of 0.2-5%.

Preferred forms of PVAc include products known as B-9 and B-25 available from McGean. Product B-9 is a polyvinyl acetate having a molecular weight of 70,000 g/mol and a softening point of 125° C. Product B-25 has a higher molecular weight of 140,000 g/mol, and a softening point of 155° C.

Preferred forms of the PAV copolymer (vinyl acetate/vinyl versatate copolymer) include Rhoximat PAV 29 from Rhodia Inc.

In the compositions of table 1, the total thermoplastics component may include any combination of PVB, PVAc and PAV, or it may exclude one or more of these, within the parameters of that table. When PVB is used it can be recycle PVB, such as recycled PVB from the automotive industry, either plasticized or unplasticized. Preferably, the PVB component from table 1 includes a substantial proportion of recycled PVB, for example at least 10, preferably at least 20, 30, 40 or 50 percent (by weight) of total PVB used. Optionally and in a preferred embodiment, the PVB that is used comprises 100% or substantially 100% recycled PVB. When recycled PVB is used, the recycled material typically includes or may include a small quantity of plasticizer (e.g. 5%, more typically 10-35%), such as phthalate-type or hexanoate-type plasticizers, which are compatible with PVB. This is particularly true in the case where recycled PVB is recycled and produced from auto safety glass. PVB from this source typically will include from 10 to 35 weight percent plasticizer, such as the phthalate-type or hexanoate-type plasticizers mentioned above. Common phthalate-type plasticizers include Saniticizer 160, which is a triethylene glycol dibutylphthalate material available from Monsanto. Common hexanoate-type plasticizers include S-2075, which is a Di-2-Ethylhexanoate material available from Solutia. Depending on the source of the recycled PVB, the plasticizer therein may be a phthalate-type plasticizer, a hexanoate-type plasticizer or a combination of the two. Alternatively, the plasticizer may be of a different type that is compatible with PVB like castor oil. Recycled PVB from auto glass preferably is sufficiently processed to remove substantially all glass therefrom prior to being formulated into the compositions disclosed herein. However, it is to be recognized that it may be difficult to remove absolutely 100% of the glass therefrom, so it is contemplated that compositions herein that incorporate recycled PVB from auto safety glass may include very small or trace amounts of glass introduced from the recycled PVB. This is considered inconsequential. It is to be noted that any plasticizer incorporated into the compositions of table 1 from recycled PVB is in addition to the separate plasticizer component that is described below.

In addition to PVB and/or PVAc and/or PAV, other thermoplastic resins may be included, such as ethylene vinyl acetate (EVA) (e.g. AT2850 or AT2803 available from AT Plastics), ethylene methyl acrylate (EMA) (e.g. TC-220 available from Exxon—having 24% methyl acetate units and 5.0 melt index), and ethylene octene copolymer (e.g. Engage 8200 available from Dow—having a comonomer ratio of 24%, melt index of 5.0 and a density of 0.87 g/cm$^3$). Other EVA components that may be used include product designations 5528 (28% vinyl acetate units, 650 melt index) 5510 (18% vinyl acetate units, 1 melt index), 5518 (18% vinyl acetate unites, 30 melt index) and 2803 (28% vinyl acetate, 3.0 melt index), all available from ACE Plastics Inc. Alternatively, other suitable types of thermoplastics may be added to the PVB and/or PVAc/PAV to provide the total thermopoastics in the compositions of table 1. Most preferably, a composition made according to table 1 includes at least one of PVB and PVAc, and if it is to include only one, then most preferably PVB, which can be recycled PVB. In a preferred embodiment, wherein the composition includes PVB such as recycled PVB, it also includes a mixture of EVA polymers, including a first EVA polymer having a melt index less than 5, preferably about 2, and a second EVA polymer having a melt index greater than 25, preferably about 30. The two EVA polymers preferably are provided in substantially equal quantities in the composition, for example 8-15, preferably 11.4 weight percent each, and preferably each has about 18% vinyl acetate units. Two such polymers are EVA 5510 and EVA 5518, respectively.

In another embodiment, the composition for the damping material has a greater concentration of recycled PVB material than is contemplated in table 1, i.e. 35-55, preferably 39-50 weight percent recycled PVB. In this embodiment, the composition preferably also includes 8-15, preferably 10-12 weight percent total ethylene vinyl acetate (EVA), for example a mixture of EVA 5518 and EVA 2803, or of EVA 2803 and EVA 5510. In this embodiment, recycled PVB and EVA make up the total thermoplastic component of the composition. Also in this embodiment, the filler component can make up the bulk of the remainder of the composition, e.g. 25-50, preferably 30-40 weight percent. All other components of the composition can have concentrations disclosed in table 1 and elsewhere in this application. According to one example of this embodiment, the composition further includes, for example, 2.5-2.8 weight percent tackifier, 0.5-1 weight percent surfactant, 0.3-1 weight percent activator, 0.3-1 weight percent colorant and 5-10, preferably 6-8 weight percent plasticizer, with 3-4 parts by weight per hundred rubber (explained more fully below) of a suitable blowing agent. As will be appreciated, polyvinyl acetate and vinyl acetate/vinyl versatate copolymer can be omitted in this embodiment. The plasticizer component in table 1 is used to adjust the performance temperature range of the finished damping layer 14. Suitable plasticizers that are compatible with the thermoplastic resin may be used. Some plasticizers that have been found useful are Castor oil (#1 Castor Oil available from CAS Chem), S-2075 (triethylene glycol di-2-ethylhexanoate available from Solutia) for PVB thermoplastic, and G-62 (epoxydized soybean oil available from CP Hall) for PVAc thermoplastic. Other plasticizers that may be used include polyester plasticizers such as Paraplex G-50 and polybutene plasticizers such as Indopol H1500. Any other plasticizer that is compatible with the thermoplastic resin, or a combination of plasticizers, may be used. In one embodiment, the plasticizers mentioned above, which are typically found in recycled PVB from auto glass, also may be used separately to make up or as part of the separate plasticizer component from table 1, so long as they will be compatible with the total thermoplastic resin composition.

The filler component in table 1 is preferably an inorganic filler material, preferably dolomite. For example, Dolomite 60 may be used, which includes both calcium carbonate and magnesium carbonate as principal components. Alternatively other inorganic fillers may be used including, but not limited to, calcium carbonate, limestone, clay, talc, silica or mica, other silicates known in the art and other mineral fillers. The filler material preferably has or is ground to a particle size in the range of 10-250 microns before compounding.

The tackifier in table 1 causes the damping layer 14 to adhere to the panel 12 to be damped, typically an automotive body panel, and to the constraining panel 16, preferably without the necessity of special surface treatments to the panels 12 and 16 and preferably without inhibiting the flow of the composition that forms the damping layer 14 during the blowing stage (i.e. while it is being blown into a porous foam). It is to be noted, however, that in some cases the layer(s) 12 and/or 16 may have been primed or painted before foaming and applying the damping layer 14 thereto. Preferably the tackifier is Sukorez SU-120 which is a hydrogenated DCPD (dicyclopentadiene) hydrocarbon tackifier available from Kolon Chemical. Other aromatic or aliphatic tackifiers may be used such as Wingtack 86 or Wingtack 95 available from Goodyear or Picco 1104 (aromatic hydrocarbon tackifier resin) available from Harwick. Other tackifiers that may be used or considered depending on the application include: terpene resins, terpene-phenol resins, rosins, aromatic hydrocarbon tackifiers, polyterpene resins, more preferably $C_5$ and $C_9$ hydrocarbon resins (such as petroleum-based), and Resinex resins such as Resinex 100F from Harwick.

The process aid in table 1 is used to improve the process characteristics of the damping material composition during manufacturing and foaming. Suitable process aids are Promix 750, a blend of straight asphalt and oxidized asphalt available from Flow Polymers, Zinc Stearate available from Dover Chem and Calcium Stearate available from Novac Corp. These process aids may be used singularly or in combination. Other process aids may include, for example, diethylenehexyl sebacate, dibutyl sebacate, di-(2 ethylhexyl)adipate, paraffinic oils (e.g. Stanlube 60, Stanlube 80, Stanlube 100). Alternative process aids include a magnesium soap or fatty acid soap or combination thereof. Alternatively, other suitable process aids may be used.

The blowing agent in table 1 facilitates foaming of the damping material composition to produce and expand the layer 14, which is a porous foam layer, from the initial precursor composition prepared from table 1. It will be appreciated that foaming and expanding the layer 14 to its final thickness facilitates contact between the final damping layer 14 and the panel 12 to be damped one side, and the constraining panel 16 on the other side. The blowing agent is preferably a blend of azodicarbonamide such as Unicell D-300 available from Dong Jin and p,p'-oxybis-(benzene sulfonyl hydrazide) such as Unicell OH available from Dong Jin. Preferably, the blowing agent is predispersed in a compatible carrier, preferably EVA. In one embodiment, the blowing agent is provided as 14 wt. % azodicarbonamide, 26 wt. % oxybis-benzene-sulfonylhydrazide, 60 wt. % EVA carrier. EVA (ethylene vinyl acetate) is a thermoplastic and would fall in the category of "other thermoplastics" from table 1. When EVA or other thermoplastic carrier is used as a dispersant, its contribution to the total thermoplastic formulation according to the compositions of table 1 should be considered. Other suitable blowing agents may be used, for example Kempore 200 or other Kempore, Celogen OT, Celogen 754 or other Celogen, or other blowing agents known in the art. When the blowing agent is predispersed in a carrier base, it is also preferred to combine the activator in the dispersion. Preferably about 0.4 parts activator are combined with 1.5 to 2.0 parts blowing agent, such as Unicell D-300 or Unicell OH, in the carrier or dispersing agent. The blowing agent produces a foam vibration damping material and facilitates intimate contact between the vibration damping material layer and both the panel to be damped and the constraining layer.

Optionally, an activator may be used to help initiate the blowing agent. Preferably, zinc oxide available from Zinc Corp of America can be used. Other activators found to be useful are calcium oxide available from CP Hall or Unicell BM (Zn-dibenzene sulfinate) available from Dong Jin. Zinc stearate and calcium stearate, or combinations of any of the foregoing, may also be used.

Optionally a colorant may be added, preferably carbon black, preferably predispersed in an equal amount of a carrier such as EVA.

An additional optional additive is 0-2%, more preferably about 1%, moisture absorbent such as CaO, which can be added if there is excessive moisture in the composition. Other moisture-absorbing materials also may be used, including silica and other conventionally known desiccants. A further additive that may be included is 0.05-0.8, more preferably about 0.1-0.4, weight percent additional activator such as Zn-dibenzene sulfinate (Unicell-BM), which can be added to lower the blowing or activation temperature. Other additives known in the art also may be added in conventional amounts. For example, in one embodiment a small quantity of surfactant is incorporated into a composition from table 1. A preferred surfactant is sorbitan monopalmitate, also known as Span-40, and is provided as 0.5-2 weight percent of the composition, preferably 0.5-1 weight percent, most preferably 0.8 weight percent.

The amounts and ranges of thermoplastic polymer, plasticizer, filler and tackifier permit the formulation to be customized for specific applications accounting for service temperature and a balance of sound-transmission reduction and vibrational-damping properties.

The vibration-damping material is compounded as known in the art from the components in table 1, such as by blending and pelletizing at elevated temperature, for example about 300-400° F. A preferred method of compounding is as follows. First, the ingredients from table 1 except the blowing agent are dry blended into a powder mix that preferably has a uniform composition of the ingredients. Then the powder mix is added to an extruder (high-mixing type) and pelletized. The pellets are then blended with the blowing agent to produce a master batch, which is then processed and sheet-extruded to form sheets of the resulting damping material in unexpanded, as-yet unfoamed form.

To make a constrained layer damping structure such as shown in FIG. 1, a sheet of expandable vibration damping material according to a composition of claim 1, which can be produced via sheet-extrusion as described in the preceding paragraph, is die cut to the desired shape. The die-cut sheet is then bonded or attached to a substrate or panel 12 to be damped, such as an automobile body panel. Alternatively, the die-cut sheet can be bonded or attached to a constraining sheet or layer 16. The bonding or attachment of the die-cut sheet to a panel 12 or constraining layer 16 can be achieved by methods known in the art, such as heat staking or via mechanical fasteners Less preferably adhesive may be used if necessary. The second outer sheet (layer 12 or 16 to which the die-cut sheet of damping material has not been attached) is then attached to the first outer sheet (layer 12 or 16 to which the die-cut sheet has been attached) with the sheet of damping material therebetween to form a sandwich structure of the three layers. The two outer sheets (layers 12 and 16) are preferably attached with a standoff or offset as known in the art (such as by using embossments to separate the sheets) so that the inner damping material sheet (which is an expandable layer) occupies only a portion, for example about or less than ⅔, of the distance between the two outer layers 12 and 16 to allow for subsequent expansion of the expandable material to form the finished, foam damping layer 14. The constrained layer damping structure is then heated to expand and foam the vibration damping material. When the panel 12 to be damped is an automobile panel, assembly of the foregoing sandwich structure can be completed prior to the automobile body panel or the vehicle to which it is attached passes through the E-coat process and the bake oven. During the E-coat bake cycle the blowing agent is activated and the vibration damping material expands, filling the space or gap between the two outer layers 12 and 16 to provide the finished damping layer 14 according to the structure shown in FIG. 1. The E-coat bake cycle is typically about 10 min. at 180° C. to about 30 min. at 205° C. For further information on the above, see U.S. Pat. Nos. 4,456,705; 4,734,323; 5,213,879; 5,271,612; 5,300,355; and 5,635,562, the contents of all of which are incorporated herein by reference. Similar techniques can be used in other applications of the invention.

In automotive applications such as the wheel well, the dashboard, the floor boards, the roof, the firewall and other applications, the area to be damped is analyzed for both vibrational and transmission properties. To minimize weight and cost, the area to be covered by a constrained layer damping structure or damping system is optimized to the minimum area required to achieve the desired sound and vibration reduction. For example, in the automotive wheel well a metal constraining layer of the preselected dimensions is stamped to conform to the wheel well surface and to be offset therefrom a fixed distance corresponding to the final thickness of the foam vibration damping material layer.

The vibration damping material composition in its unexpanded state preferably has the following physical properties: specific gravity of 1.1-1.6, more preferably about 1.3; 50% maximum ash content (ASTM D-297); Shore A durometer hardness of 70-90, more preferably about 80 or 85; no cracking after a flexibility test of bending a 50×25×1 mm sample 180 times by hand; tear strength of at least 11, more preferably at least 12, 16, 19 or 21 kN/m (ASTM D624, Die C); elongation at break of at least 80, more preferably at least 90, 100, or 120, percent (ASTM D638); tensile strength of at least 1.6, more preferably at least 2 or 2.5, Mpa (ASTM D638).

The vibration damping material in its expanded or foamed state (i.e. in the state of the final foam damping layer 14) preferably has the following physical and noise control properties: volume expansion of 50-220%, more preferably 100-200% or 120-150% (FLTM BV 108-02); maximum water absorption of 5%, more preferably 2% (FLTM BV 117-01); lap shear adhesion between bonded metal layers (ASTM D1002) minimum of 6160 N/m, more preferably 7000 or 7500 or 8500 N/m, preferably via cohesive failure mode; [removed fogging properties] transmission loss (SAE J1400, 24"×24"×0.026" steel) of 20 dB at 125 Hz, 25 dB at 250 Hz, and 30 dB at 500 Hz; loss factor at 200 Hz at various temperatures as follows (table 2):

TABLE 2

| Temp. | Minimum loss factor at 200 Hz |
| --- | --- |
| 15° C. | 0.05, preferably 0.08, preferably 0.10, preferably 0.15 |
| 23° C. | 0.10, preferably 0.12, preferably 0.14, preferably 0.20 |
| 30° C. | 0.15, preferably 0.20, preferably 0.24, preferably 0.27 |
| 45° C. | 0.20, preferably 0.24, preferably 0.28, preferably 0.30 |
| 60° C. | 0.05, preferably 0.10, preferably 0.15 |

EXAMPLES

The examples in the following tables further illustrate various aspects of the invention. In the following examples, all composition data are given as weight percents for the specified component based on the total composition for each example, minus the blowing agent. Blowing agent is given in "parts per hundred rubber" by weight or "phr," where 'rubber' here conventionally refers to all the other components in the composition. The blowing agent itself in all cases was 14% azodicarbonamide and 28% oxybis-benzenesulfonylhydrazide in an EVA carrier. All other data for each example are given in the units as specified. Loss factor is a unitless quantity as known in the art. Compositions according to the following examples have been prepared, and their physical and damping characteristics measured, as indicated in the data below.

|  | Examples | | | | |
| --- | --- | --- | --- | --- | --- |
| Component | 1 | 2 | 3 | 4 | 5 |
| EVA 5510 | 14.0 | 16.9 | 16.8 | 11.5 | 11.4 |
| EVA 5518 | 14.0 | — | — | 11.5 | 11.4 |
| EVA 5528 | — | 3.6 | 6.0 | — | — |
| SU-120 | 6.9 | 5.9 | 5.0 | 5.1 | 5.1 |
| Promix 750 | 6.5 | 5.9 | 7.0 | 4.9 | 4.9 |
| Zinc Stearate | 0.4 | 0.4 | 0.4 | 0.4 | 0.4 |
| Calcium Stearate | 0.4 | 0.4 | 0.4 | 0.4 | 0.4 |
| Zinc Oxide | 0.4 | 0.4 | 0.4 | 0.4 | 0.4 |
| Carbon Black Dispersion | 0.4 | 0.4 | 0.4 | 0.4 | 0.4 |
| Span-40 | 0.8 | 0.8 | 0.8 | 0.8 | 0.8 |
| B-79 | — | 10.7 | 10.7 | — | — |
| PVB Recycled | — | — | — | 16.0 | 16.1 |
| Castor Oil | — | — | 4.0 | — | 4.5 |
| S-2075 | — | — | 3.2 | — | — |
| Dolomite 60 | 56.2 | 54.6 | 44.9 | 48.6 | 44.2 |
| Blowing Agent | 3.6 phr | 3.6 phr | 3.6 phr | 3.6 phr | 3.6 phr |
| Melt Index at 135° C. 2.160 kg wt | 3.3 g/10 min | 1.6 g/10 min | 7.2 g/10 min | 3.5 g/10 min | 5.5 g/10 min |
| Volumetric Expansion at 325° F. for 20 minutes | 169% | 131% | 138% | 133% | 144% |
| Volumetric Expansion at 400° F. for 30 minutes | 153% | 158% | 200% | 160% | 193% |
| Loss Factor at 200 Hz and 15° C. | 0.08 | 0.03 | 0.14 | 0.06 | 0.15 |
| Loss Factor at 200 Hz and 23° C. | 0.13 | 0.04 | 0.17 | 0.10 | 0.22 |
| Loss Factor at 200 Hz and 30° C. | 0.15 | 0.05 | 0.25 | 0.15 | 0.36 |
| Loss Factor at 200 Hz and 45° C. | 0.12 | 0.09 | 0.22 | 0.28 | 0.29 |
| Loss Factor at 200 Hz and 60° C. | 0.09 | 0.14 | 0.11 | 0.29 | 0.10 |
| Loss Factor at 200 Hz and 75° C. | 0.06 | 0.34 | 0.05 | 0.12 | 0.05 |
| Loss Factor at 200 Hz and 90° C. | 0.05 | 0.22 | 0.04 | 0.07 | 0.03 |

|  | Examples | | | | | | | |
| --- | --- | --- | --- | --- | --- | --- | --- | --- |
| Component | 6 | 7 | 8 | 9 | 10 | 11 | 12 | 13 |
| EVA 5528 | 5.2 | 5.6 | 6.0 | 6.0 | 6.0 | 6.0 | 3.6 | — |
| EVA 5510 | 17.8 | 17.4 | 17.0 | 16.8 | 16.8 | 16.8 | 16.9 | 12.8 |
| Promix 750 | 7.0 | 7.0 | 7.0 | 5.0 | 5.0 | 5.0 | 5.9 | 5.4 |
| SU 120 | 5.0 | 5.0 | 5.0 | — | 5.0 | 5.0 | 5.9 | 5.7 |
| Zinc Stearate | 0.4 | 0.4 | 0.4 | 0.4 | 0.4 | 0.4 | 0.4 | 0.4 |
| Calcium Stearate | 0.4 | 0.4 | 0.4 | 0.4 | 0.4 | 0.4 | 0.4 | 0.4 |
| Zinc Oxide | 0.4 | 0.4 | 0.4 | 0.4 | 0.4 | 0.4 | 0.4 | 0.4 |
| Carbon Black Dispersion | 0.4 | 0.4 | 0.4 | 0.4 | 0.4 | 0.4 | 0.4 | 0.4 |
| Span-40 | 0.8 | 0.8 | 0.8 | 0.8 | 0.8 | 0.8 | 0.8 | 0.8 |
| Dolomite | 45.5 | 44.7 | 44.7 | — | 46.2 | 46.2 | 54.6 | 50.2 |
| Castor Oil | 6.4 | 7.2 | 4.0 | 8.5 | 3.6 | 3.6 | — | — |
| S-2075 | — | — | 3.2 | — | 4.3 | 4.3 | — | — |

-continued

|  | | | | | | | | |
|---|---|---|---|---|---|---|---|---|
| B-79 | 10.7 | 10.7 | — | — | — | 10.7 | 10.7 | — |
| B-98 | — | — | 10.7 | 10.7 | 10.7 | — | — | 10.7 |
| A-1 CaCO₃ | — | — | — | 44.6 | — | — | — | — |
| Picco 1104 | — | — | — | 6.0 | — | — | — | — |
| EVA 5518 | — | — | — | — | — | — | — | 12.8 |
| Blowing Agent | 3.6 phr | 3.6 phr | 3.6 phr | 3.6 phr | 3.6 phr | 3.6 phr | 3.6 phr | 3.6 phr |
| Melt Index at 135° C. 2.160 kg wt | 6.4 g/10 min | 7.6 g/10 min | 8.8 g/10 min | 8.1 g/10 min | 7.2 g/10 min | 7.4 g/10 min | 1.6 g/10 min | 1.7 g/10 min |
| Volumetric Expansion at 325° F. 20 minutes | 139% | 130% | 129% | 119% | 126% | 137% | 131% | 150% |
| Volumetric Expansion at 400° F. 30 minutes | 193% | 179% | 170% | 172% | 200% | 200% | 158% | 196% |
| Loss Factor at 200 Hz and 15° C. | 0.15 | 0.21 | 0.11 | 0.15 | 0.12 | 0.20 | 0.03 | 0.06 |
| Loss Factor at 200 Hz and 23° C. | 0.26 | 0.30 | 0.13 | 0.21 | 0.17 | 0.27 | 0.04 | 0.07 |
| Loss Factor at 200 Hz and 30° C. | 0.49 | 0.42 | 0.18 | 0.34 | 0.25 | 0.32 | 0.05 | 0.08 |
| Loss Factor at 200 Hz and 45° C. | 0.21 | 0.21 | 0.27 | 0.25 | 0.22 | 0.15 | 0.09 | 0.09 |
| Loss Factor at 200 Hz and 60° C. | 0.08 | 0.08 | 0.14 | 0.11 | 0.11 | 0.08 | 0.14 | 0.10 |
| Loss Factor at 200 Hz and 75° C. | — | — | — | — | — | — | 0.34 | 0.17 |
| Loss Factor at 200 Hz and 90° C. | — | — | — | — | — | — | 0.22 | 0.18 |

| | Examples | | | | | | | | | |
|---|---|---|---|---|---|---|---|---|---|---|
| Component | 14 | 15 | 16 | 17 | 18 | 19 | 20 | 21 | 22 | 23 |
| PVB Recycled | 12.0 | 12.0 | 12.0 | 12.0 | 12.0 | 12.0 | 12.0 | 12.0 | 12.0 | 12.0 |
| EVA 5518 | 16.3 | 14.0 | 14.0 | 14.0 | 14.0 | 14.0 | 14.0 | 14.0 | 14.0 | 14.0 |
| SU 120 | 6.5 | 6.0 | 6.0 | 6.0 | 6.0 | 6.0 | 6.0 | 6.0 | 6.0 | 6.0 |
| Promix 750 | 6.5 | 6.0 | 6.0 | 6.0 | 6.0 | 6.0 | 6.0 | 6.0 | 6.0 | 6.0 |
| Zinc Stearate | 0.4 | 0.4 | 0.4 | 0.4 | 0.4 | 0.4 | 0.4 | 0.4 | 0.4 | 0.4 |
| Calcium Stearate | 0.4 | 0.4 | 0.4 | 0.4 | 0.4 | 0.4 | 0.4 | 0.4 | 0.4 | 0.4 |
| Zinc Oxide | 0.4 | 0.4 | 0.4 | 0.4 | 0.4 | 0.4 | 0.4 | 0.4 | 0.4 | 0.4 |
| Carbon Black Dispersion | 0.4 | 0.4 | 0.4 | 0.4 | 0.4 | 0.4 | 0.4 | 0.4 | 0.4 | 0.4 |
| Span 40 | 0.8 | 0.8 | 0.8 | 0.8 | 0.8 | 0.8 | 0.8 | 0.8 | 0.8 | 0.8 |
| Dolomite | 56.3 | 53.6 | 53.6 | 53.6 | 53.6 | 53.6 | 53.6 | 53.6 | 53.6 | 53.6 |
| Castor Oil | — | 6.0 | — | — | — | — | — | — | — | — |
| Di-ethylhexyl sebacate | — | — | 6.0 | — | — | — | — | — | — | — |
| Di-(2 ethylhexy) Adipate | — | — | — | 6.0 | — | — | — | — | — | — |
| Stanplast 100 | — | — | — | — | 6.0 | — | — | — | — | — |
| Stanlube 60 | — | — | — | — | — | 6.0 | — | — | — | — |
| Stanlube 80 | — | — | — | — | — | — | 6.0 | — | — | — |
| Paraplex G-62 | — | — | — | — | — | — | — | 6.0 | — | — |
| Indopol H1500 | — | — | — | — | — | — | — | — | 6.0 | — |
| Dibutyl Sebacate | — | — | — | — | — | — | — | — | — | 6.0 |
| Blowing Agent | 3.6 phr | 3.6 phr | 3.6 phr | 3.6 phr | 3.6 phr | 3.6 phr | 3.6 phr | 3.6 phr | 3.6 phr | 3.6 phr |
| Melt Index at 135° C. | 2.6 g/10 min | 27.4 g/10 min | 34.6 g/10 min | 32.3 g/10 min | 28.6 g/10 min | 44.7 g/10 min | 38.1 g/10 min | 12.3 g/10 min | 24.4 g/10 min | 22.9 g/10 min |

-continued

| | | | | | | | | | | |
|---|---|---|---|---|---|---|---|---|---|---|
| 2.160 kg wt | | | | | | | | | | |
| Loss Factor at 200 Hz and 15° C. | 0.02 | 0.15 | 0.10 | 0.11 | 0.08 | 0.09 | 0.10 | 0.06 | 0.11 | 0.11 |
| Loss Factor at 200 Hz and 23° C. | 0.03 | 0.23 | 0.12 | 0.17 | 0.11 | 0.11 | 0.13 | 0.11 | 0.15 | 0.19 |
| Loss Factor at 200 Hz and 30° C. | 0.05 | 0.35 | 0.17 | 0.26 | 0.14 | 0.12 | 0.17 | 0.18 | 0.18 | 0.29 |
| Loss Factor at 200 Hz and 45° C. | 0.11 | 0.23 | 0.23 | 0.29 | 0.24 | 0.17 | 0.22 | 0.32 | 0.34 | 0.28 |
| Loss Factor at 200 Hz and 60° C. | 0.33 | 0.10 | 0.17 | 0.13 | 0.27 | 0.23 | 0.24 | 0.18 | 0.28 | 0.13 |

| | Examples | | | | | | | | | | | |
|---|---|---|---|---|---|---|---|---|---|---|---|---|
| Component | 24 | 25 | 26 | 27 | 28 | 29 | 30 | 31 | 32 | 33 | 34 | 35 |
| B-25 | 6.5 | 7.0 | 6.0 | 7.0 | — | — | — | — | — | — | — | 7.0 |
| B-9 | — | — | — | — | 7.0 | 6.0 | 1.5 | 1.5 | 1.5 | 5.0 | 7.0 | — |
| SU 120 | 6.0 | 10.0 | 7.0 | — | — | 6.0 | 3.6 | 3.6 | 3.6 | 7.0 | 5.9 | 5.9 |
| Promix 750 | 6.0 | 6.0 | 5.0 | 6.0 | 6.0 | 6.0 | 3.6 | 3.6 | 3.6 | 2.0 | 5.6 | 5.6 |
| Zinc Stearate | 0.4 | 0.4 | 0.4 | 0.4 | 0.4 | 0.4 | 0.4 | 0.4 | 0.4 | 0.4 | 0.4 | 0.4 |
| Calcium Stearate | 0.4 | 0.4 | 0.4 | 0.4 | 0.4 | 0.4 | 0.4 | 0.4 | 0.4 | 0.4 | 0.4 | 0.4 |
| Zinc Oxide | 0.4 | 0.4 | 0.4 | 0.4 | 0.4 | 0.4 | 0.4 | 0.4 | 0.4 | 0.4 | 0.4 | 0.4 |
| Carbon Black Dispersion | 0.4 | 0.4 | 0.4 | 0.4 | 0.4 | 0.4 | 0.4 | 0.4 | 0.4 | 0.4 | 0.4 | 0.4 |
| Span 40 | 0.8 | 0.8 | 0.8 | 0.8 | 0.8 | 0.8 | 0.8 | 0.8 | 0.8 | 0.8 | 0.8 | 0.8 |
| G-50 | 3.5 | 4.2 | 3.0 | 4.2 | 4.2 | 3.0 | — | 4.0 | 1.0 | 3.7 | — | — |
| Castor Oil | — | — | — | — | — | — | 4.0 | — | 3.0 | | — | — |
| Dolomite | 51.3 | 46.1 | 52.3 | 46.1 | 46.1 | 52.3 | 48.9 | 48.9 | 48.9 | 56.9 | 52.5 | 52.5 |
| EVA 5510 | 20.0 | 17.8 | 17.8 | 17.8 | 17.8 | 17.8 | — | — | — | — | 13.3 | 13.3 |
| EVA 5528 | 4.3 | 6.5 | 6.5 | 6.5 | 6.5 | 6.5 | 2.0 | 2.0 | 2.0 | 4.0 | — | — |
| Picco 1104 | — | — | — | 10.0 | 10.0 | — | — | — | — | — | — | — |
| Engage 8200 | — | — | — | — | — | — | 10.0 | 10.0 | 10.0 | — | — | — |
| EMA 220T | — | — | — | — | — | — | 10.0 | 10.0 | 10.0 | — | — | — |
| EVA 2803 | — | — | — | — | — | — | — | — | — | 19.0 | — | — |
| PVB Recycled | — | — | — | — | — | — | 14.0 | 14.0 | 14.0 | — | — | — |
| EVA 5518 | — | — | — | — | — | — | — | — | — | — | 13.3 | 13.3 |
| Blowing Agent | 3.6 phr | 3.6 phr | 3.6 phr | 3.6 phr | 3.6 phr | 3.6 phr | 3.6 phr | 3.6 phr | 3.6 phr | 3.6 phr | 3.6 phr | 3.6 phr |
| Melt Index at 135° C. 2.160 kg wt | 4.8 g/ 10 min | 9.5 g/ 10 min | 5.2 g/ 10 min | 6.1 g/ 10 min | 6.4 g/ 10 min | 5.8 g/ 10 min | 5.2 g/ 10 min | 5.3 g/ 10 min | 5.8 g/ 10 min | 16.2 g/ 10 min | 3.3 g/ 10 min | 3.2 g/ 10 min |
| Volumetric Expansion at 325° F. and 20 minutes | 121% | 132% | 136% | 270% | 205% | 127% | 122% | 121% | 125% | 165% | 165% | 149% |
| Volumetric Expansion at 400° F. and 30 minutes | 209% | 224% | 225% | 276% | 271% | 215% | 227% | 250% | 225% | 223% | 168% | 187% |
| Loss Factor at 200 Hz and 15° C. | 0.12 | 0.08 | 0.08 | 0.07 | 0.09 | 0.11 | 0.15 | 0.05 | 0.15 | 0.25 | 0.06 | 0.06 |
| Loss Factor at 200 Hz and 23° C. | 0.20 | 0.17 | 0.15 | 0.10 | 0.12 | 0.19 | 0.26 | 0.08 | 0.27 | 0.20 | 0.07 | 0.08 |
| Loss Factor at 200 Hz and 30° C. | 0.29 | 0.24 | 0.21 | 0.15 | 0.17 | 0.21 | 0.36 | 0.15 | 0.34 | 0.19 | 0.10 | 0.09 |
| Loss Factor at 200 Hz and 45° C. | 0.22 | 0.22 | 0.23 | 0.15 | 0.18 | 0.17 | 0.28 | 0.45 | 0.25 | 0.11 | 0.13 | 0.13 |
| Loss Factor at 200 Hz and 60° C. | 0.12 | 0.10 | 0.12 | 0.15 | 0.14 | 0.10 | 0.11 | 0.22 | 0.11 | 0.06 | 0.29 | 0.23 |
| Loss Factor at 200 Hz and 75° C. | — | — | — | — | — | — | — | — | — | — | 0.15 | 0.17 |
| Loss Factor at 200 Hz and 90° C. | — | — | — | — | — | — | — | — | — | — | 0.07 | 0.10 |

-continued

| Component | Examples | | | | | | | | |
|---|---|---|---|---|---|---|---|---|---|
| | 36 | 37 | 38 | 39 | 40 | 41 | 42 | 43 | 44 |
| PVB Recycled | 16.0 | 16.0 | 16.2 | 16.2 | 16.2 | 16.2 | 16.2 | 16.2 | 16.2 |
| EVA 5510 | 11.5 | 11.4 | 11.4 | 11.4 | 11.4 | 11.4 | 11.4 | 11.4 | 11.4 |
| EVA 5518 | 11.5 | 11.4 | 11.4 | 11.4 | 11.4 | 11.4 | 11.4 | 11.4 | 11.4 |
| SU 120 | 5.1 | 5.1 | 5.1 | 5.1 | 5.1 | 5.1 | 5.1 | 5.1 | 5.1 |
| Promix 750 | 4.9 | 4.9 | 4.9 | 4.9 | 4.9 | 4.9 | 4.9 | 4.9 | 4.9 |
| Zinc Stearate | 0.4 | 0.4 | 0.4 | 0.4 | 0.4 | 0.4 | 0.4 | 0.4 | 0.4 |
| Calcium Stearate | 0.4 | 0.4 | 0.4 | 0.4 | 0.4 | 0.4 | 0.4 | 0.4 | 0.4 |
| Zinc Oxide | 0.4 | 0.4 | 0.4 | 0.4 | 0.4 | 0.4 | 0.4 | 0.4 | 0.4 |
| Carbon Black Dispersion | 0.4 | 0.4 | 0.4 | 0.4 | 0.4 | 0.4 | 0.4 | 0.4 | 0.4 |
| Span 40 | 0.8 | 0.8 | 0.8 | 0.8 | 0.8 | 0.8 | 0.8 | 0.8 | 0.8 |
| Dolomite | 48.6 | 45.1 | 44.7 | 44.6 | 44.5 | 44.4 | 44.3 | 44.2 | 44.1 |
| Castor Oil | — | 3.7 | 3.9 | 4.0 | 4.1 | 4.2 | 4.3 | 4.4 | 4.5 |
| Blowing Agent | 3.6 phr | 3.6 phr | 3.6 phr | 3.6 phr | 3.6 phr | 3.6 phr | 3.6 phr | 3.6 phr | 3.6 phr |
| Melt Index at 135° C. 2.160 kg wt | 3.5 g/10 min | 4.3 g/10 min | 4.7 g/10 min | 4.8 g/10 min | 5.0 g/10 min | 5.1 g/10 min | 5.2 g/10 min | 5.4 g/10 min | 5.5 g/10 min |
| Volumetric Expansion at 325° F. 20 minutes | 133% | 144% | 127% | 122% | 137% | 140% | 139% | 126% | 144% |
| Volumetric Expansion at 400° F. 30 minutes | 100% | 193% | 182% | 179% | 191% | 185% | 193% | 179% | 193% |
| Loss Factor at 200 Hz and 15° C. | 0.06 | 0.07 | 0.08 | 0.09 | 0.10 | 0.13 | 0.13 | 0.14 | 0.15 |
| Loss Factor at 200 Hz and 23° C. | 0.10 | 0.13 | 0.13 | 0.14 | 0.17 | 0.19 | 0.19 | 0.20 | 0.22 |
| Loss Factor at 200 Hz and 30° C. | 0.15 | 0.20 | 0.22 | 0.21 | 0.26 | 0.26 | 0.27 | 0.39 | 0.36 |
| Loss Factor at 200 Hz and 45° C. | 0.28 | 0.43 | 0.46 | 0.32 | 0.27 | 0.27 | 0.30 | 0.24 | 0.29 |
| Loss Factor at 200 Hz and 60° C. | 0.19 | 0.22 | 0.14 | 0.12 | 0.12 | 0.12 | 0.12 | 0.11 | 0.10 |

| Component | Examples | | | | | | |
|---|---|---|---|---|---|---|---|
| | 45 | 46 | 47 | 48 | 49 | 50 | 51 |
| PVB Recycled | 39.0 | 39.5 | 49.5 | 39.5 | 16.0 | 16.0 | 16.0 |
| PICCO 1104 | 2.8 | 2.5 | — | 2.5 | 4.0 | 5.5 | 4.5 |
| Rhoximat PAV 29 | — | — | — | — | 6.0 | 6.0 | 6.0 |
| EVA 5518 | 6.0 | — | — | — | — | — | — |
| EVA 2803 | 6.0 | 12.0 | — | 2.0 | 21.0 | 21.0 | 21.0 |
| Span 40 | 0.8 | 0.8 | 0.8 | 0.8 | — | 0.8 | 0.8 |
| Zinc Oxide | 0.4 | 0.4 | 0.4 | 0.4 | — | 0.4 | 0.4 |
| Carbon Black Dispersion | 0.4 | 0.4 | 0.4 | 0.4 | 0.4 | 0.4 | 0.4 |
| Calcium Sterate | — | — | — | — | — | 0.4 | 0.4 |
| Castor Oil | 6.0 | 7.0 | 8.0 | 7.0 | 5.0 | 5.0 | 5.0 |
| CaCO$_3$ A-1 | 38.6 | 37.4 | 30.9 | 39.4 | 17.0 | 10.0 | 18.6 |
| EVA 5510 | — | — | 10.0 | 8.0 | — | — | — |
| Dolomite 60 | — | — | — | — | 6.2 | 8.6 | — |
| Densfil | — | — | — | — | 20. | 20. | 18.0 |
| Polypropylene 51520 | — | — | — | — | 2.0 | — | 4.0 |
| Promix 750 | — | — | — | — | 4.0 | 5.5 | 4.5 |
| Blowing Agent | 3.2 phr | 3.2 phr | 3.2 phr | 3.2 phr | 3.2 phr | 3.2 phr | 3.2 phr |
| Melt Index at 135° C. 2.160 kg wt | 3.5 g/10 min | 9.1 g/10 min | 1.7 g/10 min | 3.6 g/10 min | 4.0 | 8.0 | 4.1 |
| Volumetric Expansion at 356° F. 10 minutes | 121% | 120% | 140% | 144% | 160% | 200% | 165% |
| Loss Factor at 200 Hz and | 0.12 | 0.16 | 0.13 | 0.18 | 0.18 | 0.19 | 0.20 |

| | -continued | | | | | | |
|---|---|---|---|---|---|---|---|
| 15° C. | | | | | | | |
| Loss Factor at 200 Hz and 23° C. | 0.22 | 0.24 | 0.25 | 0.30 | 0.21 | 0.21 | 0.20 |
| Loss Factor at 200 Hz and 30° C. | 0.42 | 0.30 | 0.40 | 0.36 | 0.25 | 0.22 | 0.28 |
| Loss Factor at 200 Hz and 45° C. | 0.55 | 0.25 | 0.34 | 0.25 | 0.19 | 0.24 | 0.21 |
| Loss Factor at 200 Hz and 60° C. | 0.13 | 0.11 | 0.14 | 0.10 | 0.14 | 0.12 | 0.15 |

Although the preferred embodiments of the invention have been shown and described, it should be understood that various modifications and changes may be resorted to without departing from the scope of the invention as disclosed and claimed herein.

What is claimed is:

1. A composition for a vibration-damping material, comprising 5-50 weight percent polyvinyl butyral and 5-60 weight percent vinyl acetate polymer, 2-20 weight percent plasticizer, 25-65 weight percent filler, 1-15 weight percent tackifier, and 0.1-8 weight percent blowing agent, wherein the composition comprises 25-65 weight percent total thermoplastic inclusive of polyvinyl butyral and vinyl acetate polymer.

2. The composition of claim 1, comprising 10-20 weight percent polyvinyl butyral.

3. The composition of claim 1, a substantial proportion of said polyvinyl butyral being provided as recycled polyvinyl butyral that includes additional plasticizer therein.

4. The composition of claim 3, said recycled polyvinyl butyral comprising 5-35 weight percent of said additional plasticizer.

5. The composition of claim 3, said additional plasticizer in said recycled polyvinyl butyral including at least one material selected from the group consisting of phthalate-type plasticizers and hexanoate-type plasticizers.

6. The composition of claim 1, said polyvinyl butyral being entirely recycled polyvinyl butyral that includes additional plasticizer therein.

7. The composition of claim 1, further comprising 5-37 weight percent other thermoplastics.

8. The composition of claim 1, said vinyl acetate polymer comprising 8-15 weight percent of a first ethylene vinyl acetate polymer having a melt index less than 5 grams per 10 minutes, and 8-15 weight percent of a second vinyl acetate polymer having a melt index greater than 25 grams per 10 minutes.

9. The composition of claim 8, said first and second ethylene vinyl acetate polymers each having 18% vinyl acetate units.

10. The composition of claim 9, said first ethylene vinyl acetate polymer having a melt index of about 1, and said second ethylene vinyl acetate polymer having a melt index of about 30.

11. The composition of claim 1, said filler comprising calcium carbonate and magnesium carbonate.

12. The composition of claim 1, further comprising 4-9 weight percent, based on said composition, of a blend of straight asphalt and oxidized asphalt.

13. The composition of claim 1, said blowing agent comprising 14 weight percent azodicarbonamide and 28 weight percent oxybis-benzenesulfonylhydrazide dispersed in an ethylene vinyl acetate carrier, wherein the weight percentages are based on the total blowing agent present in said composition.

14. The composition of claim 1, said blowing agent being added to said composition in an amount of 3.6 parts by weight per hundred rubber, where 'rubber' refers to all of the remaining components in said composition taken together.

15. The composition of claim 1, said tackifier comprising a hydrogenated dicyclopentadiene hydrocarbon tackifier.

16. The composition of claim 1, further comprising an effective amount of activator to activate said blowing agent.

17. The composition of claim 1, comprising 10-20 weight percent polyvinyl butyral, 5-37 weight percent other thermoplastics, 3.7-4.5 weight percent plasticizer, 40-57 weight percent filler, 3.6-10 weight percent tackifier, 4-9 weight percent processing aid and 1.5-2 weight percent blowing agent.

18. The composition of claim 17, further comprising 0.4-2 weight percent activator and 0.4 weight percent colorant.

19. The composition of claim 17, said polyvinyl butyral being provided as recycled polyvinyl butyral that includes additional plasticizer therein, said additional plasticizer comprising one or more materials selected from the group consisting of phthalate-type plasticizers and hexanoate-type plasticizers.

20. The composition of claim 1, further comprising 3-15 weight percent of one or more thermoplastics selected from the group consisting of polyvinyl acetate and vinyl acetate/vinyl versatate copolymer.

21. The composition of claim 1, comprising 35-55 weight percent recycled polyvinyl butyral that includes additional plasticizer therein, 8-15 weight percent total ethylene vinyl acetate and 25-50 weight percent filler.

22. The composition of claim 21, said composition excluding polyvinyl acetate.

23. The composition of claim 21, said composition comprising 5-10 weight percent of said plasticizer.

24. A composition for a vibration-damping material, comprising 6-8 weight percent plasticizer, 39-50 weight percent recycled polyvinyl butyral that includes additional plasticizer therein, 10-12 weight percent total ethylene vinyl acetate, 30-40 weight percent filler, 2.5-2.8 weight percent tackifier, 0.5-1 weight percent surfactant, 0.3-1 weight percent activator, 0.3-1 weight percent colorant, and 3-4 parts by weight per hundred rubber of a blowing agent, wherein 'rubber' refers to all of the remaining components in said composition taken together.

25. The composition of claim 24, said recycled polyvinyl butyral comprising 10-30 weight percent said additional plasticizer.

26. A constrained layer damping structure comprising a panel to be damped, a constraining layer and a layer of foam vibration damping material sandwiched between said panel and said constraining layer, said layer of foam vibration damping material comprising the composition of claim 1 that has been expanded to a foamed state.

27. The structure of claim 26, said panel to be damped being an automobile body panel.

28. The structure of claim 26, said polyvinyl butyral being provided as recycled polyvinyl butyral comprising a quantity of plasticizer.

29. A vibration-damping composition comprising 25-65 weight percent total thermoplastic, 2-15 weight percent plasticizer, 25-65 weight percent filler, 1-15 weight percent tackifier, and 0.1-8 weight percent blowing agent, said thermoplastic component comprising two or more materials selected from the group consisting of:
- 5-40 weight percent polyvinyl butyral,
- 5-10 weight percent of one or more materials selected from the group consisting of polyvinyl acetate and vinyl acetate/vinyl versatate copolymer, and
- 0-60 weight percent other thermoplastics.

30. The vibration-damping composition of claim 29, said polyvinyl butyral being recycled polyvinyl butyral that includes a quantity of additional plasticizer therein.

* * * * *

UNITED STATES PATENT AND TRADEMARK OFFICE
CERTIFICATE OF CORRECTION

PATENT NO.         : 7,799,840 B2
APPLICATION NO.    : 11/849395
DATED              : September 21, 2010
INVENTOR(S)        : Maurice E. Wheeler and Bradley D. McDonel It is certified that error appears in the above-identified patent and that said Letters Patent is hereby corrected as shown below:

On the title page item (75), Inventor Bradley D. McDonel's residence should be "Fort Gratiot, MI".

On page 2, item (56), the patentee of U.S. Pat. No. 4,952,610 should be "Moore et al.".

Replace the table appearing at Column 3, Lines 11-27 with the following:

Table 1

| Ingredient | Preferred Weight Percent | Less Preferred Weight Percent | Still Less Preferred Weight Percent |
|---|---|---|---|
| Total Thermoplastic Resin | 25 – 42 | 20 – 50 | 15 – 65 |
| - PVB | 10 - 20 | 5 - 35 | 0 - 50 |
| - and/or PVAc/PAV | 5 - 8, or 5 - 10 | 3 - 15 | 0 - 20 |
| - and Other Thermoplastics | 5 - 37 | 3 – 42 | 0 - 60 |
| Plasticizer | 3.7 - 4.5 | 3 - 8.5 | 2 – 15, or 2 - 20 |
| Filler | 40 - 57 | 35 - 60 | 25 - 65 |
| Tackifier | 3.6 - 10 | 2 - 12 | 1 - 15 |
| Process Aid | 4 - 9 | 2 - 15 | 0.1 - 20 |
| Blowing Agent | 1.5 - 2.0 | 1 - 5 | 0.1 - 8 |
| Activator | 0.4 | 0.1 - 1.5 | 0 - 5 |
| Colorant | 0.2 | 0.1 - 2 | 0 - 10 |

At Column 4, Line 45, replace the word "unites" with the word "units".

At Column 4, Line 45, insert the word --units-- after the word "acetate".

At Column 16, the Melt Index at 135°2.160 kg wt for Components 49, 50 and 51 should be 4.0 g/10 min, 8.0 g/10 min and 4.1 g/10 min, respectively.

Signed and Sealed this
Twenty-eighth Day of December, 2010

David J. Kappos
*Director of the United States Patent and Trademark Office*